United States Patent [19]

Hottmann

[11] Patent Number: 4,955,569

[45] Date of Patent: Sep. 11, 1990

[54] REFRIGERATOR LEVELING SYSTEM

[75] Inventor: Philip F. Hottmann, Cross Plains, Wis.

[73] Assignee: Sub-Zero Freezer Company, Inc., Madison, Wis.

[21] Appl. No.: 381,531

[22] Filed: Jul. 18, 1989

[51] Int. Cl.[5] .................................................. F16M 11/00
[52] U.S. Cl. .................................... 248/188.2; 248/188.4
[58] Field of Search ................... 248/188.2, 188.4, 346, 248/346.1, 678

[56] References Cited

U.S. PATENT DOCUMENTS

| Re. 21,194 | 9/1939 | Blanchett | 248/188.2 X |
|---|---|---|---|
| 4,436,268 | 3/1984 | Schriever | 248/188.2 X |
| 4,545,556 | 10/1985 | Buist et al. | 248/346 |
| 4,576,357 | 3/1986 | Schrepfer | 248/188.2 X |
| 4,743,039 | 5/1988 | Ellis | 248/188.4 X |
| 4,763,868 | 8/1988 | Teich | 248/188.2 X |
| 4,789,121 | 12/1988 | Gidseg et al. | 248/188.2 |

*Primary Examiner*—Ramon O. Ramirez
*Attorney, Agent, or Firm*—Foley & Lardner

[57] ABSTRACT

A leveling apparatus for a refrigerator, the apparatus including a leveling assembly mounted on each side of the refrigerator, each assembly including a housing having a front and a back, a set of rollers and a leveler mounted in the front of the housing, a roller bracket assembly mounted in the back of the housing in a position to engage a ramp in the housing sloped upwardly toward the back of the housing, and a front adjusting rod connected to the roller bracket assembly for adjusting the position of the bracket assembly with respect to the ramp to level the back of the refrigerator.

13 Claims, 3 Drawing Sheets

REFRIGERATOR LEVELING SYSTEM

BACKGROUND OF THE INVENTION

1. Field of the Invention

The present invention relates to refrigerator leveling apparatus and, more particularly, to an apparatus for leveling the front and back of a refrigerator which can be adjusted from the front of the refrigerator.

2. Description of the Prior Art

Refrigerators are generally provided with roller assemblies which allow for the movement of the refrigerator forward and backward with respect to the walls of the building. Due to the variations in floor surfaces, it often becomes necessary to level the refrigerator once it has been positioned against the wall.

Leveling of the refrigerator is important in order to provide a level surface on which the articles are supported within the refrigerator. This is necessary, particularly where defrosters are used which require flow of water along channels provided within the refrigerator. If the refrigerator is not level, it could result in improper functioning of the system.

Leveler legs are commonly used for leveling the refrigerator. However, it is often impossible to level the rear of the refrigerator due to the inaccessability of the leveler legs particularly where the refrigerator fits in a preformed opening that prevents access to the back of the refrigerator.

A leveling system that can be adjusted from the front of the refrigerator is described in U.S. Pat. No. 4,789,121 entitled "System for Supporting and Adjusting Refrigerators and the Like" and issued on Dec. 6, 1988. The patent is directed to a front roller support that has a double thread arrangement for leveling the front of the refrigerator and a lever actuated roller support on the rear of the refrigerator for leveling the rear of the refrigerator. It should be noted that the refrigerator is supported on the rollers after leveling and is therefore subject to movement after leveling. Also, the use of a lever arm as the leveling system for the rear of the refrigerator requires an extremely rugged structure in order to move the rear roller from the storage position to the leveling position.

SUMMARY OF THE INVENTION

The leveling apparatus of the present invention provides for easy accessability from the front of the refrigerator to both a front leveling assembly and a back leveling assembly. This is accomplished by providing an elongate housing unit on each side of the refrigerator. Each housing unit includes a front leveling assembly and a back leveling assembly. Each leveling assembly includes a set of rollers for moving the refrigerator forward and backward. The front leveling assembly includes a leveling leg for raising the front rollers off the floor to stabilize the refrigerator and for leveling the front of the refrigerator. The back leveling assembly includes a roller bracket assembly which can be moved forwardly or rearwardly with respect to an inclined surface to raise or lower the back of the refrigerator relative to the front of the refrigerator.

One of the primary features of the leveling system is its simplicity in that both the front and rear of a refrigerator can be leveled with respect to a floor surface from the front of the refrigerator.

A further feature of the invention is the inclusion in a single housing for both the front leveling assembly and the rear leveling assembly to form a self-contained unit which can be attached to the bottom of any refrigerator cabinet.

One of the primary advantages of the invention is the ability to raise the back of the refrigerator by the application of the same amount of force.

A further advantage of the present invention is the provision of a front leveler that anchors the refrigerator in a fixed position on the floor.

Other features and advantages of the invention will become apparent to those skilled in the art upon review of the following detailed description, claims and drawings.

DETAILED DESCRIPTION OF THE DRAWINGS

Figure 1:
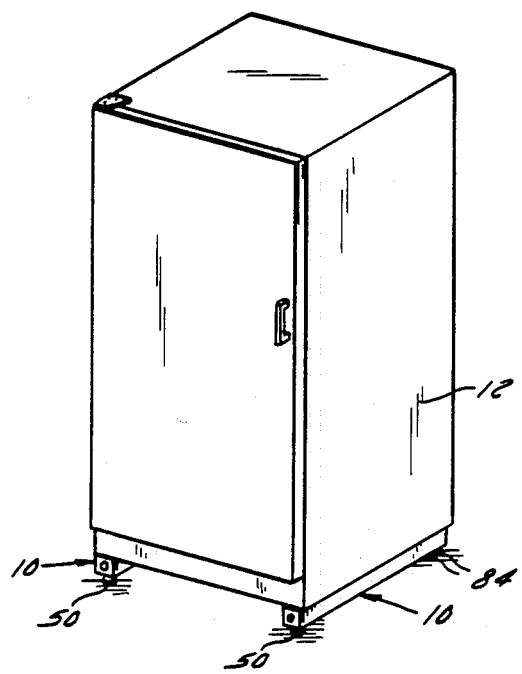
FIG. 1 is a perspective view of a refrigerator showing the leveling system according to the invention attached to the bottom of the refrigerator.
Figure 3:
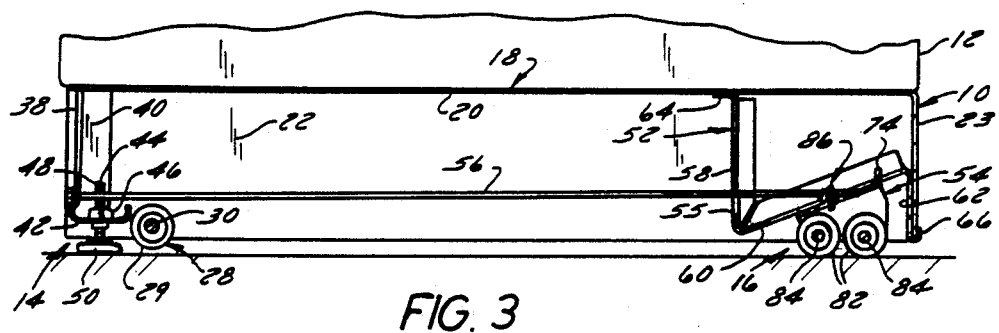
FIG. 3 is a view similar to FIG. 2 showing the unit with the ref supported by the leveling assemblies.

Before the invention can be explained in detail, it is to be understood that the invention is not limited in its application to the details as set forth in the following description or illustrated in the drawings. The invention is capable of other embodiments and of being practiced or carried out in various ways. Also, it is to be understood that the phraseology and terminology used herein is for the purpose of description and should not be regarded as limiting.

DETAILED DESCRIPTION OF A PREFERRED EMBODIMENT

The leveling apparatus 10 according to the present invention includes a pair of elongate leveling assemblies shown mounted in a parallel spaced relation on each side of the bottom of a refrigerator 12. Each leveling assembly includes a front leveling assembly 14 and a rear leveling assembly 16. The front leveling assembly 14 is used to initially set the refrigerator in position and to level the front of the refrigerator from side to side. The rear leveling assembly 16 is used to level the rear of the refrigerator with respect to the front of the refrigerator.

Each leveling assembly 10 includes a housing or cabinet 18 that extends from the front of the refrigerator to the back of the refrigerator. The housing generally includes a top 20, side walls 22, flanges 24, and inner walls 26.

Figure 5:
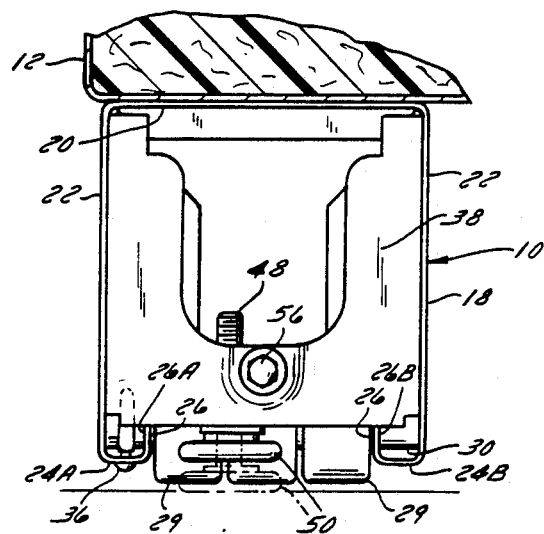
FIG. 5 is a view of the front leveling assembly.
Figure 6:
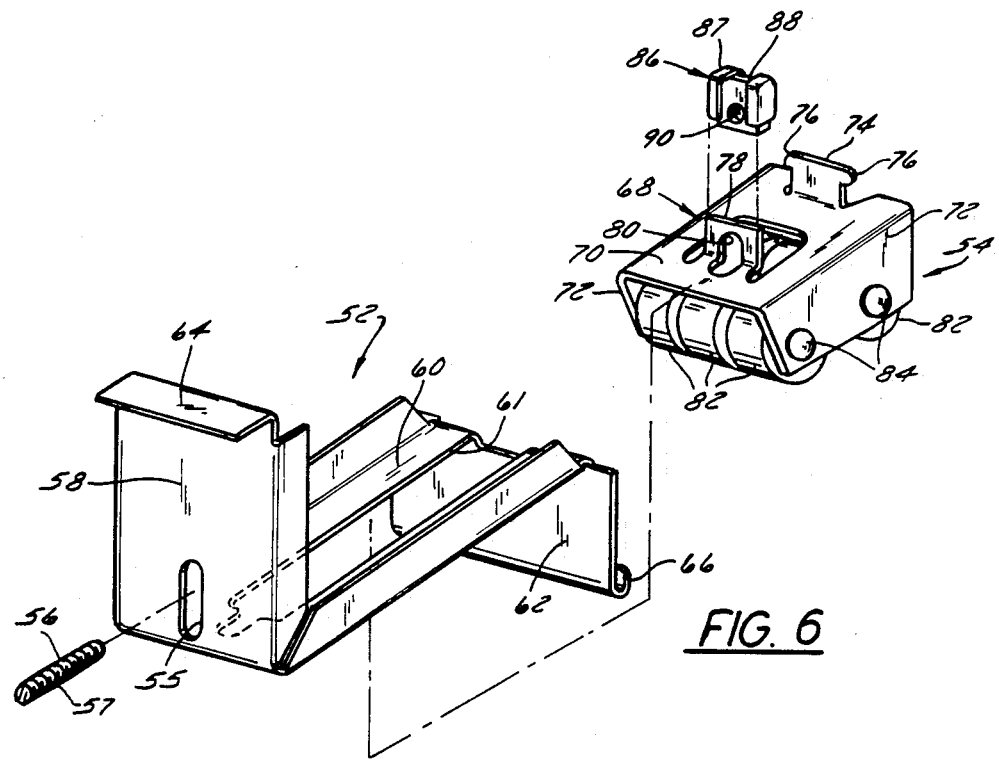
FIG. 6 is an exploded perspective view of the rear leveling assembly.

The housing 18 is supported in the front by means of the front roller assembly 28 which includes an axle or pin 30 having a set of rollers 29 mounted thereon. The front roller assembly 28 is mounted in the housing 18 by inserting one end of the axle 30 into a slot 32 in side wall flange 26A. The other end of the axle 30 is positioned in a slot 34 which extends from the bottom flange 24B into the side wall flange 26B. Once the axle 30 has been positioned in the slots 32 and 34, it is moved axially into engagement with the outer wall 22B. The axle 30 is locked into position by means of a plastic canoe clip 36 (FIG. 5) which is inserted into a hole 25 in the bottom flange 24A. The canoe clip is then located at the end of the axle 30 so that the axle cannot move axially with respect to the roller assembly 28.

Figure 2:
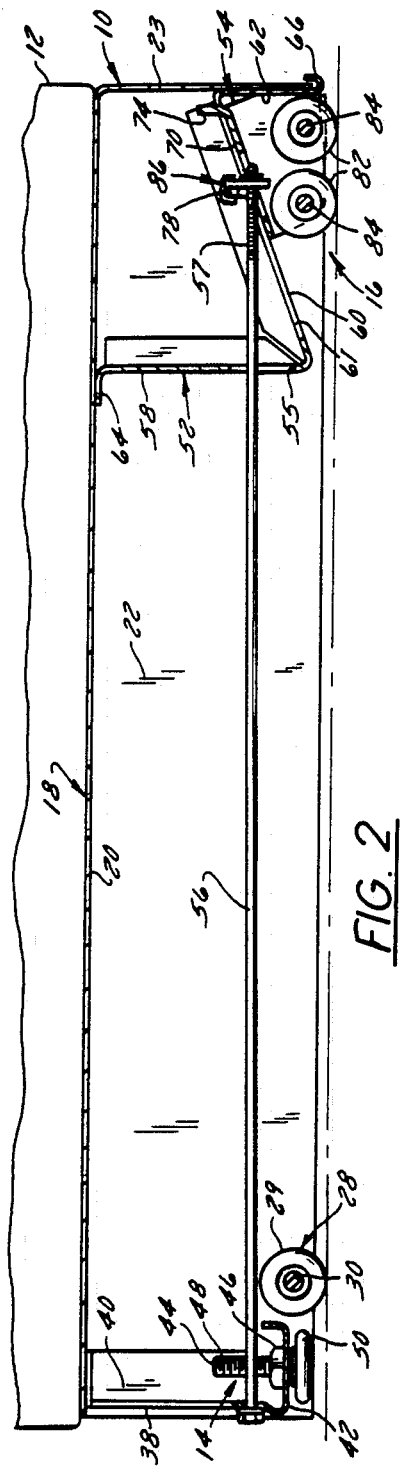
FIG. 2 is a view, in section, of the unit showing the refrigerator supported by the roller assemblies.
Figure 4:
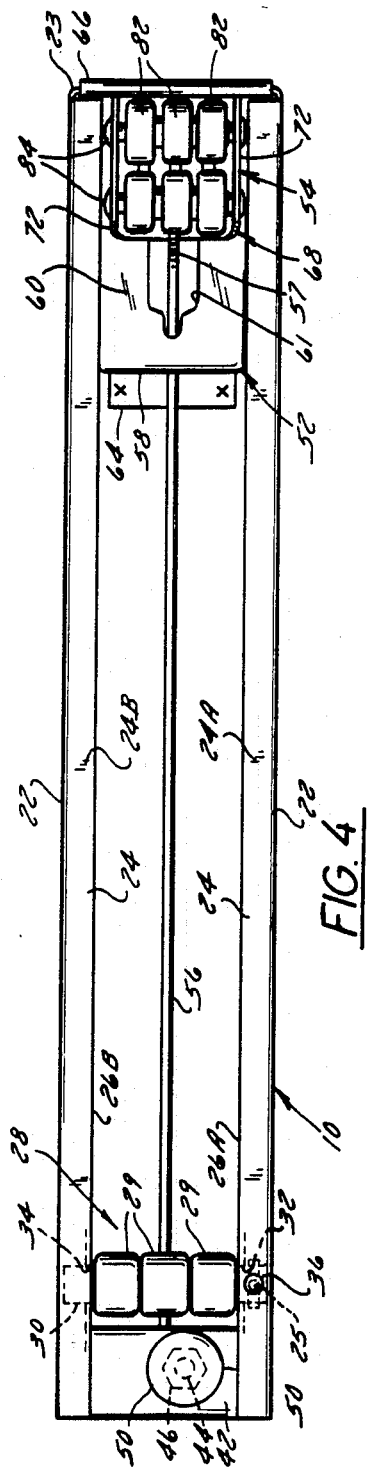
FIG. 4 is a bottom view of the housing unit.

The front of the refrigerator is leveled by means of the leveling assembly 14 which includes a bracket 38 that is mounted in the front of the housing or cabinet 18. The bracket 38 includes a pair of side walls 40 and a bottom flange 42. A leveling leg 44 is supported on the bottom flange 42 by means of a nut 46 secured to the flange 42. The leveling leg 44 typically includes a screw 48 and a plastic cap 50. The leveling legs 44 are screwed outwardly of the nut 46, as seen in FIG. 2, to raise the front of the refrigerator sufficiently to lift the rollers 29 off of the floor, thus stabilizing the front of the refrigerator as well as leveling the front of the refrigerator from side to side.

The rear leveling assembly 16 includes a rear support bracket 52 and a rear roller bracket assembly 54. The rear bracket assembly 54 is connected to the front bracket assembly 38 by means of a threaded elongate rod 56. The rod 56 is rotated to move the roller assembly 54 with respect to the bracket 52 to raise or lower the rear of the refrigerator 10. It should be noted that in the forward motion of the roller bracket assembly 16, the weight of the refrigerator must be moved vertically by the movement of the bracket assembly.

In this regard, the bracket 52 includes a front plate 58, an inclined ramp 60, and a back plate 62. The front plate 58 is secured to the top wall 20 of the housing by means of a flange 64 and to the bottom of the back wall 23 by a lip 66. Flange 64 can be spot welded to the housing or secured thereto by screws (not shown). A slot 55 is provided in plate 58 to allow clearance for rod 56. The ramp 60 has a slope of approximately 20° however, this can be varied depending upon the amount of vertical motion required at the back of the refrigerator. A guide slot 61 is provided down the center of ramp 60.

The rear roller bracket assembly 54 includes a roller bracket 68 having a top plate 70 and side walls 72. Means are provided on the top of the bracket assembly 54 for guiding the movement of the bracket assembly with respect to the ramp 60. Such means is in the form of a guide flange 74 provided on the back of the bracket 68 and a flange 78 provided in the center of the top 70. The guide flange 74 is provided with means for retaining the flange 74 in slot 61. Such means is in the form of a pair of tabs 76 which extend outwardly from flange 74 a distance greater than the width of slot 61. A slot 80 is provided in the flange 78. The bracket assembly 54 is supported for movement on the floor by means of two sets of wheels 82 supported on the side walls 72 by axles 84.

The bracket assembly 54 is connected to the rod 56 by means of a J-nut assembly 86 mounted on the flange 78. The J-nut assembly 86 includes bracket 87 for supporting a nut 88 having a threaded opening 90. The bracket 87 is mounted on the flange 78 with the threaded opening 90 in nut 88 aligned with the slot 80 in the flange 78.

The rear bracket assembly is mounted under the ramp 60 in the bracket 52 with the top 70 in mating engagement with the ramp 60. The flange 74 is aligned in slot 61 with the tabs 76 extending outwardly of the slot 61 to support the bracket 68 in the slot. The J-nut 88 is also aligned with the slot 61 in the ramp 60 to guide the bracket assembly 54 as it is moved with respect to the ramp 60. Means in the form of a white lithium lubricant can be applied to the surface of the ramp 60 to allow for the free movement of the roller bracket assembly 16 with respect to the ramp 60. The bracket assembly 54 is moved with respect to the ramp 60 by means of the rod 56 which includes a threaded section 57 that matingly engages the threaded opening 90 in the nut 88. With this arrangement a constant force is required to move the bracket assembly forwardly to raise the refrigerator.

Means are provided for biasing the bracket assembly 54 toward the back of the refrigerator. Such means is in the form of the ramp 60 which is sloped upwardly to provide a rearward bias to the bracket assembly 54. The bracket assembly 54 is moved forward by rotating the rod 56 either to the right or to the left. When the rod is rotated to the right, the bracket assembly 54 will move forward on the rollers 82 caming the rear of the refrigerator upward due to the engagement of the sloped top 70 of the bracket assembly 54 with the sloped ramp 60. When the rod 56 is rotated to the left, the bracket assembly 54 will move rearwardly. The weight of the refrigerator will also bias the assembly 54 rearwardly when the bracket assembly 54 is moved rearwardly.

Thus, it should be apparent that there has been provided, in accordance with the present invention, a leveling apparatus for a refrigerator that fully satisfies the aims and advantages set forth above. While the invention has been described in conjunction with specific embodiments thereof, it is evident that there are many alternatives, modification and variations that will be apparent to those skilled in the art. Accordingly, it is intended to embrace all such alternatives, modifications, and variations as fall within the spirit and broad scope of the appended claims.

I claim:

1. A leveling apparatus for a refrigerator, said apparatus comprising:
    a pair of leveling assemblies mounted on each side of the bottom of the refrigerator;
    each leveling assembly including a housing having a front and back, means in the front of said housing for stabilizing and leveling the front of the refrigerator, means in the back of said housing for leveling the back of the refrigerator wherein said back leveling means comprises a bracket mounted in the back of said housing, said bracket having a ramp sloped upwardly toward the back of said housing and a roller bracket assembly operably positioned to engage said ramp whereby on movement of said bracket assembly toward the front of said housing, the refrigerator will be raised and if moved toward the back of said housing, the refrigerator will be lowered; and
    adjusting means in the front of said housing operatively connected to said leveling means in the back of said housing for adjusting the position of said back leveling means with respect to said housing to level the back of the refrigerator.

2. The apparatus according to claim 1 wherein said bracket assembly includes a bracket having a top sloped to matingly engage said ramp.

3. The apparatus according to claim 1 wherein said back leveling means includes a threaded nut and said adjusting means includes a threaded rod mounted on said front leveling means and being operatively connected to said nut for moving said back leveling means relative to said ramp in the back of said housing.

4. The apparatus according to claim 3 wherein said back leveling means includes a mounting bracket having a ramp sloped upwardly toward the back of the refrigerator and a bracket assembly positioned to engage said ramp, said nut being mounted on said bracket assembly.

5. The apparatus according to claim 4 wherein said bracket assembly includes a set of rollers for supporting said housing on a surface.

6. The apparatus according to claim 5 wherein said bracket assembly includes means for guiding said bracket assembly with respect to said ramp.

7. The apparatus according to claim 6 wherein said ramp includes a slot and said guiding means comprises a pair of flanges mounted on said bracket assembly and aligned in said slot.

8. An elongate housing assembly for supporting and leveling one side of a refrigerator on a support surface, said assembly comprising:
   a housing constructed and arranged to be mounted on the bottom of one side of the refrigerator with one end facing the front of the refrigerator and the other end facing the back of the refrigerator, first means mounted in said housing for leveling the front of the refrigerator,
   second means mounted in said housing for leveling the back of the refrigerator wherein said second means includes a bracket mounted in said housing, said bracket having a ramp sloping upwardly toward the back of the refrigerator, and a roller bracket assembly having a sloped upper surface corresponding to the slope of said ramp, said upper surface of said roller bracket assembly being positioned to engage said ramp whereby movement of said roller bracket assembly in one direction will raise the refrigerator and movement in the other direction will lower the refrigerator,
   and, third means mounted in the front of said housing for adjusting the position of said second means with respect to said housing in order to level the back of said housing.

9. The assembly according to claim 8 including a first set of rollers in the front of said housing and a second set of rollers mounted in said roller bracket assembly whereby said refrigerator is supported for rolling motion on the supporting surface.

10. The assembly according to claim 9, wherein said first means comprises a leveling leg for leveling and stabilizing the front of said housing on the supporting surface.

11. The assembly according to claim 10 wherein said ramp includes a guide slot and said roller bracket assembly includes guide means operatively positioned to engage said slot to guide the movements of said roller bracket assembly with respect to said ramp.

12. A leveling apparatus for supporting a refrigerator on a floor comprising a pair of elongate housings, one of which is mounted on each side of the refrigerator,
   a front leveling assembly mounted in each housing, said front leveling assembly including a set of rollers for supporting the refrigerator for movement on the floor, and a leveling leg for raising said rollers off of the floor,
   a back leveling assembly mounted in each housing including a roller bracket assembly for supporting the refrigerator on the floor, said roller bracket assembly includes a surface sloped upwardly toward the back of the refrigerator, and
   an adjusting assembly operatively connecting said back leveling assembly to the front of the refrigerator, whereby said back leveling assembly can be adjusted from said front leveling assembly and said refrigerator is raised on movement of said roller bracket toward the front of the housing.

13. The apparatus according to claim 12 wherein said front leveling assembly includes a roller assembly, and said back leveling assembly includes a roller assembly, said front and backroller assemblies supporting a refrigerator for rolling movement on a surface.

* * * * *